Aug. 10, 1926.

E. LAURENCELLE 1,595,556

SELF CLEANING RAKE

Filed Dec. 29, 1924

Inventor.
Edmond Laurencelle

Patented Aug. 10, 1926.

1,595,556

UNITED STATES PATENT OFFICE.

EDMOND LAURENCELLE, OF CLEVELAND, OHIO.

SELF-CLEANING RAKE.

Application filed December 29, 1924. Serial No. 758,734.

This invention relates to improvements in self cleaning rakes and has for an object the provision of a stripper bar associated with the tines of a rake in such a manner that mere reversal of the normal position of a rake and allowing the rake head to drop will effect the cleaning of the tines.

A further object is to so form a rake cleaner that cumbersome and complex unsatisfactory structure is entirely eliminated and a simple inexpensive device is provided, one giving complete satisfaction at all times and easily operable.

Other objects will be in part obvious and in part pointed out hereinafter.

In the accompanying drawings forming a part of this application:—

Figure 1:
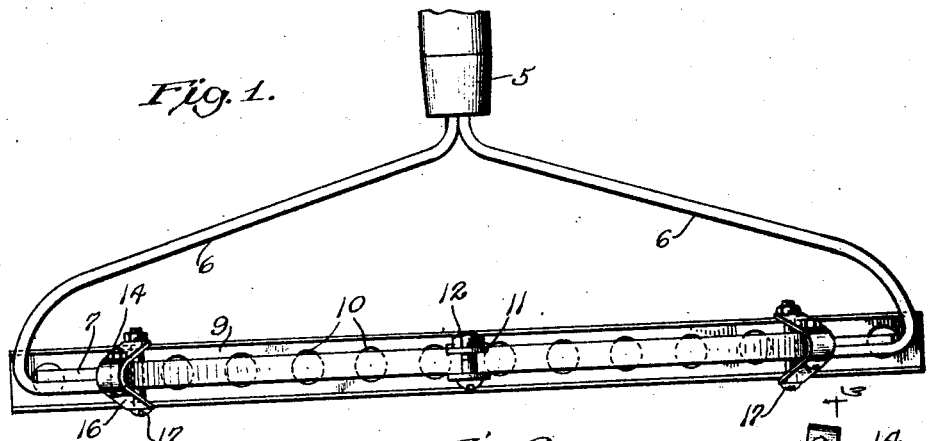
Figure 2:
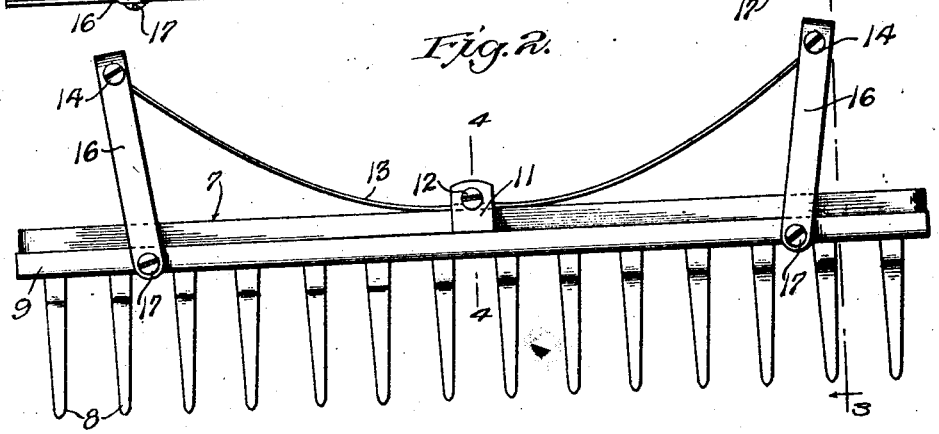

Figure 1, is a top plan view of a rake equipped with my cleaner.
Figure 2, is a front end elevation.

Figure 3:
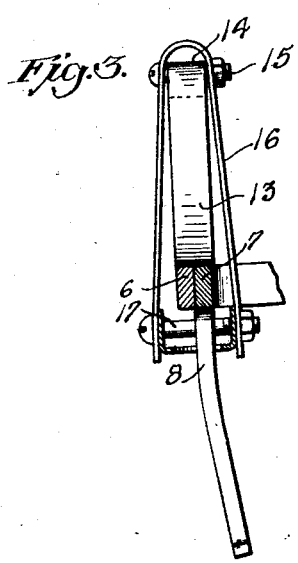
Figure 4:
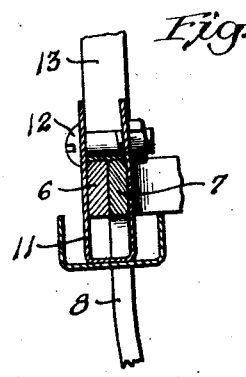

Figure 3 is a sectional view taken substantially on the line 3—3 of Figure 2; and Figure 4 is a sectional view taken substantially on the line 4—4 of Figure 2.
Having more particular reference to the accompanying drawing, in connection with which similar numerals designate like parts throughout, the numeral 5 designates an ordinary rake handle mounting at its forward end a head carrier in the form of diverging arms 6 whose ends are bent inwardly toward each other and riveted or otherwise secured to the back portion 7 of a rake head. As will be noted this back portion or bar 7 integrally carries or has affixed thereto depending tines or teeth 8 whose functions are well known.

My cleaning attachment consists in the preferred form, of a stripper bar 9 having a series of tine receiving openings 10, these openings being spaced longitudinally of the bar as shown in Figure 1. Normally, the rear upper edges of the stripper bar 9, which is preferably though not necessarily in the form of a channel iron member, bear at the ends against the forward portions of the rake head carrier arms 6.

At the medial point of the back portion or bar 7 of the rake head, eye bolt or otherwise secure to the former a V-shaped attaching clip 11, and beneath the bolt 12 is arranged a resilient stripper bar retracting element in the form of an elliptic spring 13. As will be noted, this spring has its medial portion secured beneath the bolt 12 while its ends are normally extended upwardly and rolled to form bearing sleeves 14 through which stove bolts 15 or the like are passed in order to effect pivotal connection as between the spring and links 16.

These links 16 are each in the form of an inverted substantially V-shaped strip whose lower ends straddle the outer end portions of the stripper bar 9 and are pivoted thereto by bolts 17. The aforementioned stove bolts 13 effect connection between the upper or closed ends of the links and the upturned ends of the spring bar 13. These links also form striker arms which contact with the ground or a fixed object when cleaning is being effected.

The operations may be stated as follows:—

Assuming the tines are clogged with grass or the like, the worker gives the handle a one half revolution thereby reversing the rake head as regards its normal position. At this point it is only necessary to drop the rake head and permit the striker arms or links 16 to quickly contact with a fixed solid object and by reason of such action the spring yields and the stripper bar moves to near the ends of the tines, such movement being limited by the length of the links 16 as is evident. Obviously cleaning may be effected without reversing the rake but this causes in time, unnecessary distortion of the rake teeth.

From the foregoing it is seen that a low priced, highly efficient and easily operated device is provided and consequently I preferably follow the construction shown and specifically described, but it is to be understood that certain minor changes may be resorted to without departure from the spirit of the invention as claimed.

I claim:

1. In a self cleaning rake the combination with a handle, and a tine carrying head, of a stripper bar having apertures and normally positioned adjacent the tine carrying head, a semi-elliptical spring fixed intermediate its ends to the back of the head and longitudinally alined therewith, and a pair of links pivoted at one end to the extremities of the spring and at the other end to the end portions of the stripper bar.

2. In a self cleaning rake, the combination with a head having tines, of a channel iron stripper bar having a series of spaced tine receiving openings and extending to opposite ends of the rake head, an upstanding inverted V-shaped link having its legs pivoted to opposite sides of the end portions of the bar and straddling said head, an elliptic spring having its ends rolled and disposed in the upper closed ends of the links, pivot bolts extending through said rolled ends and the links, and means rigidly and removably securing the medial portion of the spring to the rake head.

June 23, 1924.

EDMOND LAURENCELLE.